(No Model.) 4 Sheets—Sheet 1.
J. A. BARNES.
CASH REGISTER AND INDICATOR.

No. 507,097. Patented Oct. 24, 1893.

WITNESSES.
R. B. Moser.
N. S. Amstutz

INVENTOR
John A. Barnes (No Model.) 4 Sheets—Sheet 2.

J. A. BARNES.
CASH REGISTER AND INDICATOR.

No. 507,097. Patented Oct. 24, 1893.

WITNESSES.

INVENTOR.
John A. Barnes (No Model.) 4 Sheets—Sheet 3.

J. A. BARNES.
CASH REGISTER AND INDICATOR.

No. 507,097. Patented Oct. 24, 1893.

WITNESSES.
P. B. Moser.
N. S. Amstutz.

INVENTOR.
John A. Barnes

(No Model.) 4 Sheets—Sheet 4.
J. A. BARNES.
CASH REGISTER AND INDICATOR.

No. 507,097. Patented Oct. 24, 1893.

WITNESSES.
R. B. Moser
N. S. Amstutz

INVENTOR.
John A. Barnes

UNITED STATES PATENT OFFICE.

JOHN A. BARNES, OF CLEVELAND, OHIO.

CASH REGISTER AND INDICATOR.

SPECIFICATION forming part of Letters Patent No. 507,097, dated October 24, 1893.

Application filed June 2, 1892. Serial No. 435,232. (No model.)

*To all whom it may concern:*

Be it known that I, JOHN A. BARNES, a citizen of the United States, residing at Cleveland, Cuyahoga county, Ohio, have invented certain new and useful Improvements in Cash Registers and Indicators, of which the following is a full and exact description.

My invention relates to an improvement in cash registers and indicators designed for the use of store keepers and others, as a means of accurately registering the total cash receipts for any given time, as a day for instance, and for indicating to the customers, that the amount paid has been registered, by disclosing to their view such amounts upon figured tablets.

The arrangement of the parts and operation of the machine, are such that no tablet can be exhibited, without its value being counted upon registering mechanism, and whenever any tablet is disclosed it remains so until the machine is operated to disclose a second tablet.

In registering machines of this class consisting of a series of independent abutting figured disks, in one or more banks, each or each set of which was operated by its respective key, the disks would be turned more or less away from zero, or the starting point at the end of each day. It is desirable that provision should be made for resetting them to the zero point for the commencement of the succeeding day's business.

My invention has for one of its most important objects, the provision of means whereby a single complete revolution of each of the disk shafts, will cause the simultaneous resetting of all the disks upon each shaft, so as to bring all of their zero marks under the reading apertures, which resetting can be done instantly, without expenditure of labor and loss of time.

The novelty of my invention consists in the construction, combinations, and arrangements of the various parts, as will be herewith set forth and specifically claimed.

In the accompanying drawings

I provide any suitable box or case, A, ornamented as desired, and of the general shape indicated, though its shape and ornamentation may be varied indefinitely. In this outer case is fitted a metal frame work consisting chiefly of two upright sides, B, united by a cross bar frame, G, and by the shafts and bars which support the operating mechanism. In the lower portion of the frame and extending horizontally across it, is a shaft, D, supported by and aiding to connect the sides B, of the frame. Upon this shaft are hung two series of parallel keys, E, and, W, one series shorter than the other, in the present instance eleven of each series, or twenty two in all, arranged in pairs, one short and one long key constituting a pair.

An important feature of my invention, is the method of arranging the front ends of the keys. Each of the long series, has upon its front end, an enlargement, $N^4$, Figs. 1, 2, and 10, slotted or perforated, $N^5$, and the front end of each of the short series is so shaped as to fit loosely into the perforation of the other, so that by pressing the finger over the slot in which the end of the short key is projecting, $N^6$, and by continuing the pressure both keys will be moved together. The arrangement of the slot may be reversed and the end of the short key slotted and the end of the other projecting into it.

It is not necessary for the practical operation of the machine, that the ends of the keys be constructed as just described, but such a combination is essentially an important improvement over the bare ends of the keys as much more care would have to be exercised in striking them without the combination just described. Either key of each pair bears a tablet, $N^2$, Figs. 1, 2, and 10, having marked on it a figure to correspond with the value intended to be indicated and registered whenever that pair of keys is operated by depression.

Figure 10:
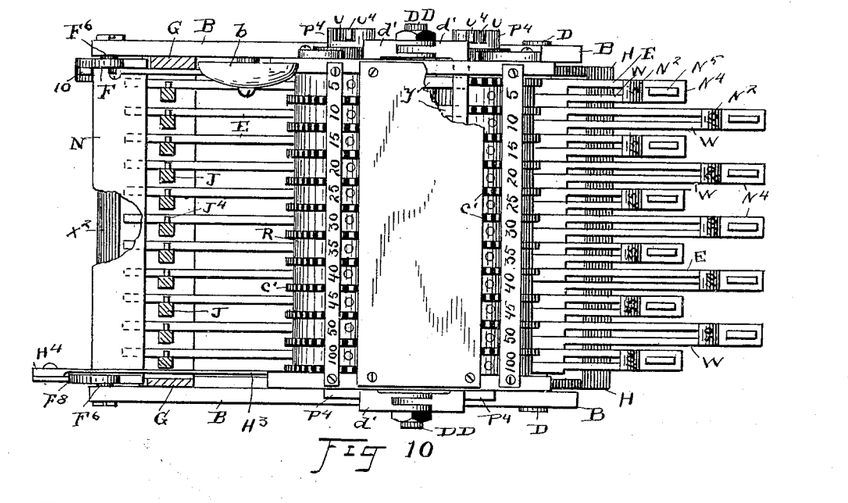
Fig. 10, is a plan view of the mechanism.

In a machine with eleven keys the first tablet to the right would be numbered, 5, the second, 10, and the third, 15, to represent five, ten and fifteen cents and so on progressively. The ends of the keys are arranged in two banks, one above the other, so as to avoid making the machine unnecessarily wide, as shown in Figs. 1, 2, and 10.

The keys, E, and, W, are separate from each other and perform separate duties, but it is essential that each of the pair should move simultaneously to perfectly perform the work required of them, and that means be provided whereby they cannot be operated singly. To provide for this I have invented a controlling or governing mechanism. In front of the downward extension of keys, W, Figs. 1, and 2, is a cross bar, K, which swings on shaft, D, when any one of the short keys is depressed. Behind the tablet rods and hanging over the ends of the keys, E, is a key-arrester, N, Figs. 1, 2, and 13, which is provided with progressive projections, $F^2$, arranged in such a manner that the ends of the keys, E, would come in contact with some one of them, unless they were swung out of the circle, which the back ends of the keys would make, when forward ends were depressed their full stroke. At either end and fastened to the key-arrester, N, are two rocking plates, F, fulcrumed at $F^6$ Figs. 1, 2, and 10. As shown in Fig. 1, the right hand rocking plate is connected to the cross bar K, by rod, $F^4$. Underneath the keys in front of shaft D is a cross bar, H, Figs. 2 and 10, which would be depressed by the under side of keys, E, when any one of them was depressed. This bar swings at, $H^2$, and carries on its back end at, $H^4$, a follower bearing on back edge of rocking plate at, $F^8$. The back edge of rocking plate is cut on a circle as shown at, $F^8$, Fig. 2. This circle is about the same that the follower on, $H^4$, makes when cross bar, H, is depressed by the keys, E. When the follower is swung toward the top of the rocking plate the point of contact of follower comes nearer the fulcrum, $F^6$, of rocking plate. As the follower travels toward the fulcrum the operation of keys, W, through connection of cross bar, K, rod, $F^4$, Fig. 1, pushes the rocking plate carrying the key-arrester, N, with progressive projections out of the path of long keys, E, moving always so as to clear a little in advance of the end of the key. Thus it will be seen that if any attempt was made to operate key, E, alone, the back end of it would be raised against projection on key-arrester, N, over which it has no control, and could not be advanced until key, W, was equally depressed, swinging the key-arrester, N, away from the ends of the keys, E. Then again if key, W, was operated alone it could not advance as the follower on rod at, $H^4$, would bind on back of rocking plate preventing it from swinging. This being the case, the cross bar, K, being held from moving, the key, W, could not be farther depressed; but on the simultaneous depression of the pair of keys, all impediments offered by each singly are overcome.

Figures 1, 12:
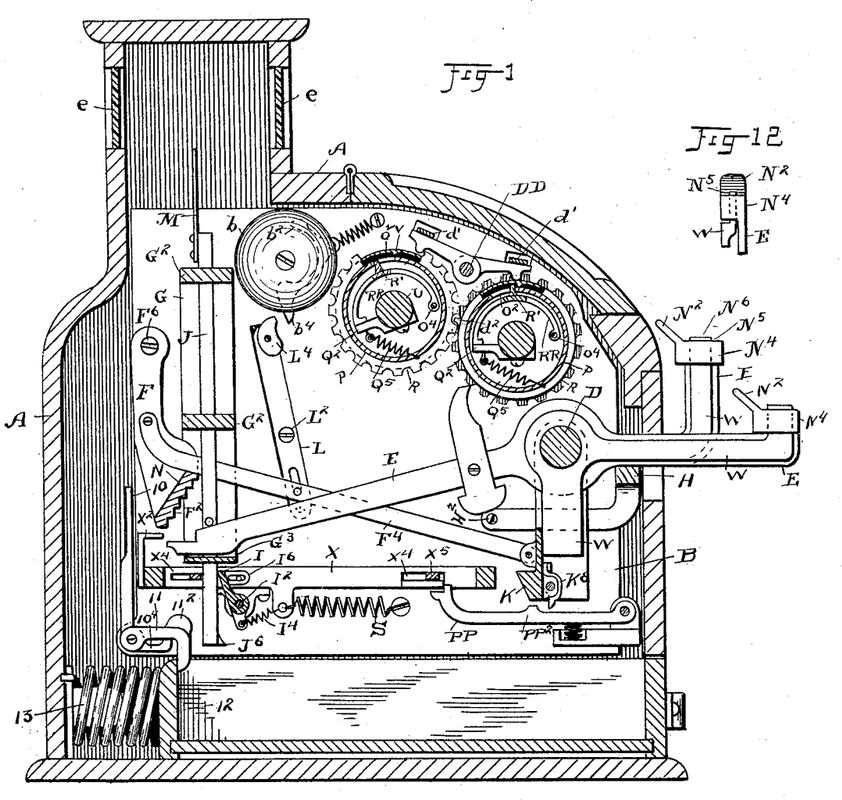
Figure 1, is a sectional side elevation of my improved machine, looking toward its right hand side.
Fig. 12, is an end view of a pair of keys at operating end.
Figures 2, 3, 4, 13, 17:
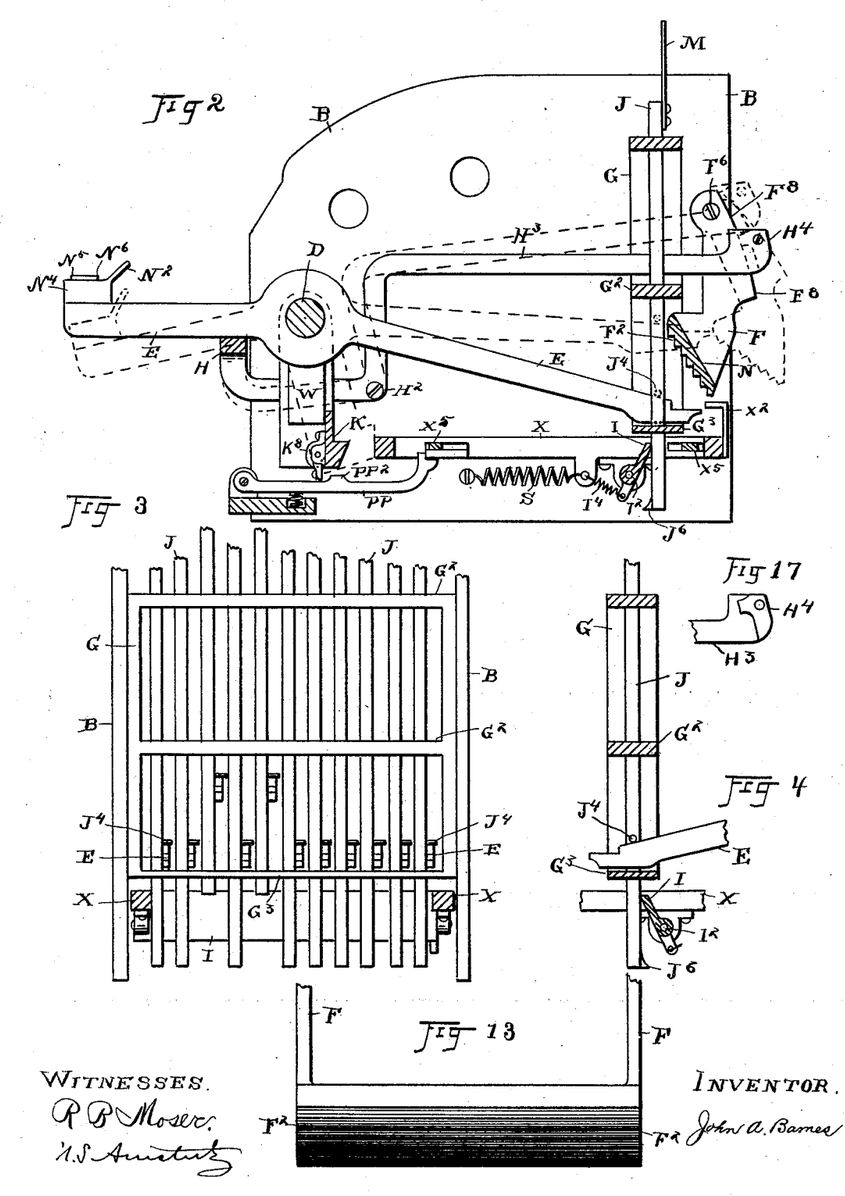
Fig. 2, is a corresponding view looking toward the left hand side of the machine.
Fig. 3, is a rear view of tablet rod guides, supporting wing and ends of long keys.
Fig. 4, is a side view of wing and tablet rod.
Fig. 13, is a front view of the cross bar arrester in rear of keys, showing progressive projections.
Fig. 17, is a view of rocking plate follower.

Resting on the ends of the keys, E, by shoulder, $J^4$, Figs. 1, and 2, are vertical tablet rods, J, one for each long key, which pass and have vertical play perforations in metal guide bars, $G^2$, extending across and supported by sides, B. These rods may be any shape in cross section, though I prefer to make them square, with square perforations in guide bars $G^2$. The rods extend below the lower guide bars and on the lower ends have a beveled projecting shoulder, facing forward shown at, $J^6$, Figs. 1, and 4, for a purpose to be explained. Secured to the top of each rod is a tablet, M, of thin metal and upon the face of each tablet is a number corresponding with the number upon the key, over whose rear end the rod of that tablet rests. Thus the tablet of the rod resting upon the key whose button is marked, 5, is likewise marked, 5, and so on through the series.

In order to get the tablets in as narrow a space as possible and thus not make the machine wider than necessary, I bend their stems so that the tablets can overlap each other and yet can be operated without interfering one with the other.

In the upper portion of the case is a large horizontal opening, extending across the front of the case and covered with transparent glass $e$, Fig. 1. When the keys are in their normal positions of rest, with the rods, J, resting upon their rear ends, all of the tablets are hidden from view below the lower edge of opening, $e$, but when any key is pressed down by means of its button, the rod of that key is raised and its tablet exposed to view through the glass, $e$. After a key has been operated, and its tablet exposed to view, such tablet shall remain up and exposed until another key is operated, whereupon the first falls back out of view and the second remains exposed, and so on, thus always keeping in view the tablet of the key last operated. To effect this result I suspend on the sliding frame, X, Figs. 1, 2, and 4, extending between the sides so as to move with it a tablet supporting wing, I, fulcrumed at, $I^2$. This wing is located just forward of all the tablet rods inclining rearward and is free to vibrate on its pivoted axis, $I^2$. It is yieldingly held in its normal position by any suitable spring, a spiral spring being shown for that purpose at, $I^4$, Figs. 1 and 2, secured at one end of the wing and to the side of the frame, X. The slot, $I^6$, Fig. 1, regulates the movement of wing on its fulcrum.

The operation of the mechanism just described is as follows: When any pair of keys is operated the key, E, on whose rear end the tablet rod rests is lifted, raising the tablet rod and tablet up in the guides, bringing the beveled shoulders at the bottom up close to the lower guide bar. In doing so the wing has been lifted by the passage of the beveled shoulder and has returned to its normal position, either by its own weight or with the assistance of a spring. On release of the keys the rod will drop down until the shoulder rests on top of the wing and is held there by it. While the operation is being performed the key, W, of the pair has moved the cross bar, K, tripping the dog, allowing the sliding frame to be drawn forward carrying with it the wing, I. As the forward movement of the wing is greater than the width of the shoulder on the rods, it will have withdrawn its support and all raised tablet rods will fall to their normal positions. This having taken place at the early movement of the key, W, and on the full depression, the frame and wing will have been returned to their normal positions and support the rod raised by the key, E, of the pair, and hold it suspended until the next operation of any pair of keys.

Another feature of my invention is the means provided for locking all unoperated keys, after any pair of keys has been partially operated, until they have completed their full stroke. For instance should the finger of the operator slip off the keys after making a partial stroke, and means were not provided for arresting the keys, they would fall back to their normal positions. The registering disks operated by the keys would have been partially moved, the indicating tablets previously raised would have been released, and the tablet of the key partially operated, not moved far enough to engage supporting ring. Therefore a partial registration would have been made and still the indicating tablets would not be exposed. To prevent the return of partially operated keys to normal position, until they have performed their full stroke, and to lock all unoperated keys until the partial'y operated key has completed its full stroke, I use a movable frame, X, Figs. 1 and 2. This frame carries on its end the locking bar, $X^2$, which extends above the ends of the keys E and is bent forward so as to slip over the ends, when the frame is drawn back. This frame is suspended between the sides, B, on rods which pass through the frame as shown at, $X^5$. The slots in the frame through which the rods pass are oblong and of sufficient length to allow the frame to move forward on the rods the necessary distance to lock the keys. The cross bar, K, carries a tripping dog, $K^8$. Immediately below the tripping dog is the spring pressed retaining dog, P', with a hump, $P^2$, on its top surface. This hump is of such a height that the tripping dog, $K^8$, will, when cross bar K, is operated, come in contact with it and depress it. In doing this, it releases the sliding frame, which has been drawn against its forward end by spiral spring S, Figs. 1 and 2, allowing the frame to travel the distance necessary to lock the keys. On the continued depression of keys the cross bar, K, comes in contact with the front end of sliding frame and forces it back so that the spring pressed retaining dog engages with and holds it until the next depression of a pair of keys. In doing so the ends of unoperated keys are uncovered and the keys just operated will fall back to normal position.

Now the operation of this much of the machine is as follows: When any pair of keys is pressed down their tablet rods and tablets are raised and the beveled projection on rod in raising aids in pressing back the wing, T, but to aid the projection, the wing is carried forward by the frame, X, and is drawn from under any rods previously suspended and which have been resting on it. Immediately after the trigger has tripped the frame carrying wing, the previously suspended rods will fall. When the frame carrying it has been forced back, the wing will support rod of key then operated, and hold it until the operation of any pair of keys. During this operation the key, E, of the pair operated has raised and suspended its tablet rod and operated the follower on rocking plate, so as to allow the keys, W, through rod, $F^4$, to swing the rocking plate and key-arrester, N, clear of the ends of keys, E, also release the sliding frame, locking the unoperated keys until the operating pair have been depressed to their farthest limit and sounded a gong, and only then gives notice to the customer that the machine has been properly operated. Whenever the same key is successively operated, its rod and the tablet remain up, and exposed to view, but when a different key is operated, the tablet of the previous one is released and falls back out of sight, and the tablet of the operated key remains up and exposed. At each full depression of the keys, the locking dog is raised releasing the cash receptacle.

The above constitutes the indicating mechanism. I will now describe the registering device.

Figure 5:
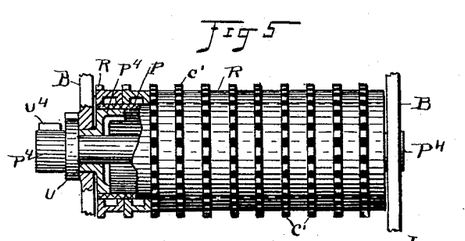
Fig. 5, is a broken top view of registering disks, exposing part of tubular shaft operating pawls.
Figures 6, 11:
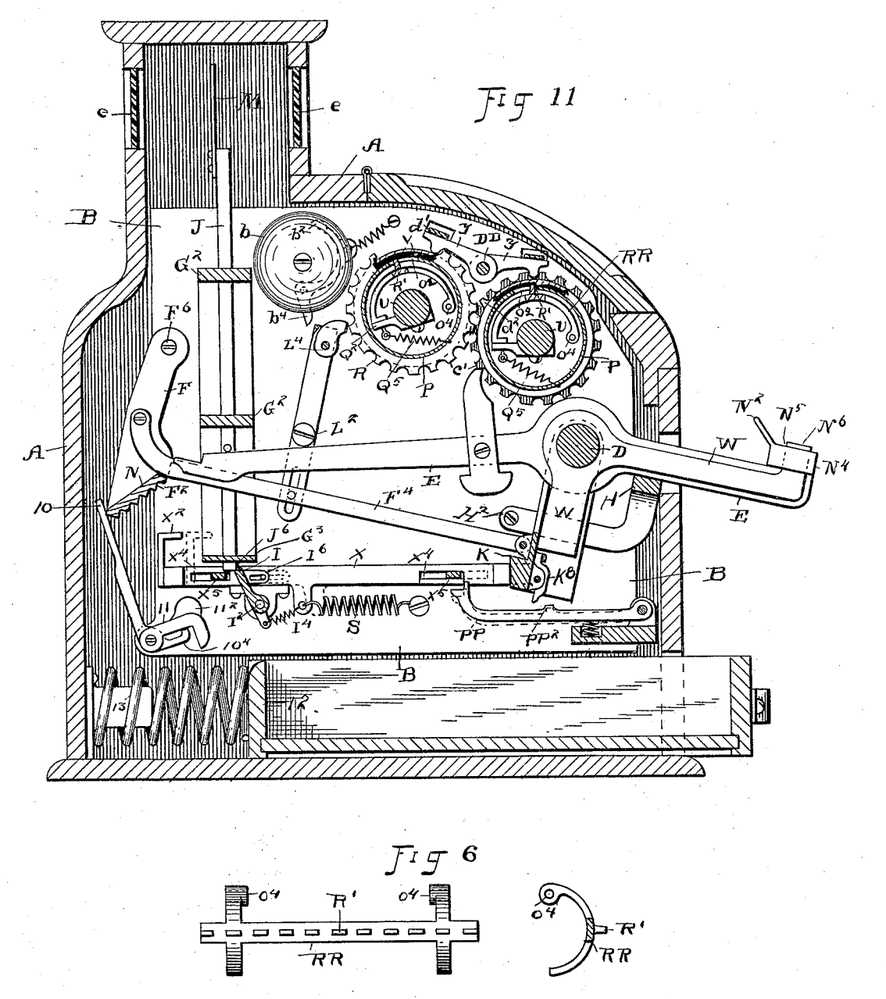
Fig. 6, is a top and end view of bridge and projections, removed from the tubular shaft.
Fig. 11, is a view of right hand side of machine showing the position parts take when any pair of keys have been operated to their full stroke.
Figures 7, 14, 15:
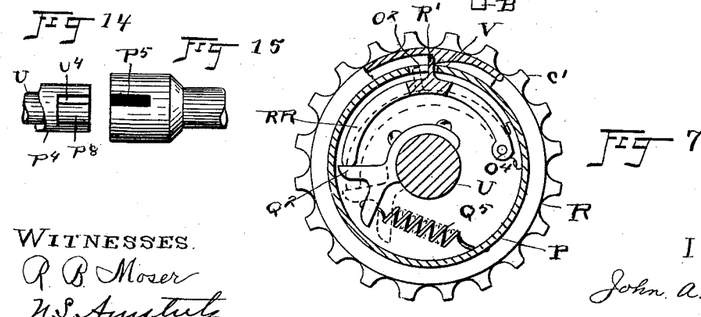
Fig. 7, is a sectional end view of disks, tubular shaft and pawl operating shaft. The dotted lines show normal position of bridge and pawls.
Fig. 14, is a side view of the projecting end of tubular shaft bearing showing slot.
Fig. 15, is a view of socket key.
Figure 8:
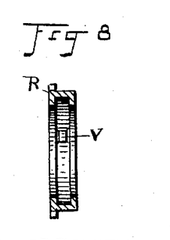
Fig. 8, is a cross section through one of the disks, showing catch for engagement with resetting projections or pawls.
Figure 9:
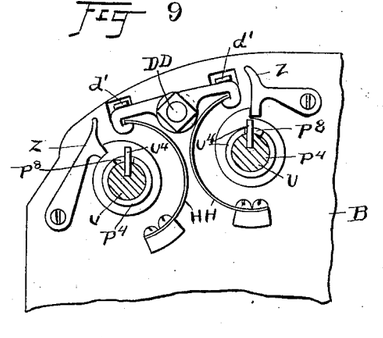
Fig. 9, is an end view of the shafts and the dogs to retain the shafts in position while wheels are being operated by keys, also tension device for ratchet dogs over counting wheels.
Figure 16:
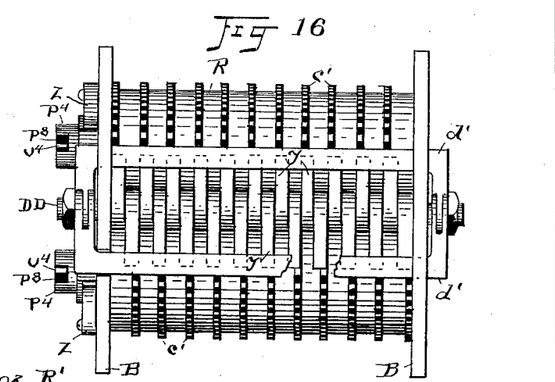
Fig. 16, is a top view of counting wheels and ratchet dogs for working in their ratchets, also tension mechanism.

On the two parallel tubular shafts, P, Fig. 1, is strung a series of disks or wheels, R, Figs. 1 and 5. Those on each shaft abut the one against the other, but are loose upon the shafts so as to revolve thereon. The wheels are in pairs, one pair over each key of the machine—that is to say there are two wheels over each key—one on the first or lower shaft and one on the second or upper shaft, Fig. 1, the two being in line and with their peripheries close to each other. The wheels on the upper shaft I will designate as "dollar" wheels, and those on the lower shaft as cent wheels. Each of these wheels has at one side a ratchet, C', projecting slightly above the periphery and having twenty teeth. The ratchets on the cent wheels are all on one side, say the right hand side thereof, while those on the dollar wheels are all on the opposite or left hand side. This arrangement is effected so as to bring the two sets of wheels close together. Upon each of the cent wheels there is a radial projecting pin or stud $d^2$ Fig. 1, secured in any suitable manner and arranged in line with the ratchets on the dollar wheels, so that on every complete revolution of the cent wheel, this pin comes in contact with one of the teeth of the ratchets on the dollar wheels and revolves them one notch or a twentieth of a revolution. The tubular shafts, P, are fastened to hollow end journals, $P^4$, one for each end. These journals have their ends secured in the sides, B, and aid in supporting the same. The tubular shafts each have a slot or perforation, $O^2$, Figs. 1 and 7, one for each counting wheel revolving on them, or it may be one continuous slot across the face of the tube, to allow projections of the pawls on the bridge hinged on the inside of the shaft. As shown in Fig. 6, the pawls or projections R', one for each of the counting wheels are arranged on a semicircular bridge piece R, R. This bridge piece with its projections, is hinged inside of the tubular shaft by means of a rod or trunnions, $O^4$, Fig. 1, fastened to the end bearings at each end or may be fastened to boxes attached to the tubular shaft, being hung so that when the bridge piece is raised up against the inside of the shaft, P, the projections or pawls are pushed up through the slot in tubular shaft as shown at, $O^2$, Figs. 1 and 7 for a purpose to be explained farther on. Passing through the tubular shaft, P, and loosely journaled in the hollow ends of bearings, is a shaft, U, carrying brackets on which pawl bridge rests as shown at $Q^2$ Fig. 1. To the lower part of the bracket is fastened one end of a spiral spring $Q^5$. The other end of the spring is fastened to the tubular shaft, P, so that when the shaft carrying the bracket is turned to raise the bridge and projections as shown at $Q^2$ Fig. 1, the spiral spring will be extended, and on release of shaft the spring will draw shaft and bracket to normal position allowing bridge and projection to follow. The hollow journal of tubular shaft extends through frame B and one end is slotted as shown at, $P^3$, Figs. 9 and 14. Through this journal the shaft U extends, and has fastened to it a key piece narrower than the slot $P^3$, Figs. 9, 14, and 16 in journal of shaft and higher shown at $U^4$, Figs. 5 and 9. When the socket key Fig. 15 is forced on over the end of the journaled bearing, its slot $P^5$ will allow the projecting key piece $U^4$ on shaft U, Figs. 9, 14 and 16 to enter it. All the disks on counting wheels are channeled out in their centers as shown in sectional drawing, Fig. 9, having a single projecting stop on their inside circumferences fastened in any suitable manner shown at V, Figs. 1 and 9, the location of which may determine the zero mark. These wheels are intended to turn on the tubular shaft with their channels immediately over the perforations for pawls—that is if the projections on bridge were raised through tubular shaft, the disks would revolve freely until projection, V, in the channel came in contact with projecting pawls on the bridge underneath. Fig. 9, shows dogs Z which hold the shafts, P, stationary while counting wheels are being turned by keys E, and their connections.

The operation of the mechanism just described is as follows: the counting wheels having been operated more or less and turned away from the zero mark, it may be desirable at the beginning of each day to bring the zero marks on all the wheels in line underneath the reading aperture. This can be readily done by forcing the socket key on the journal of the tubular shaft bearing, holding the slot of the key so that the projection on shaft, U, at its end will enter it. On turning the key so as to bring the extension against the edge of the slot opposite the one against which the spring draws it, the bracket on the shaft U, will have raised the semicircular bridge toward the shell of the tubular shaft, throwing the projection out through the slot, so that on a continuation of turning the key the tubular shaft will be also revolved, the wheels being held at a standstill by the spring pressed ratchet dogs Y, Figs. 1 and 16, until the projecting pawl meets the projection on the wheel in its channel. At this point the wheel in revolving raises the ratchet dogs out of the notch of ratchet and accompanies the tubular shaft. This takes place at some period of the revolution of the tubular shaft on all the wheels, and at a complete revolution all the wheels will be found in line at the zero mark.

On the rear lower end of frame B, Fig. 1, is fulcrumed lever 10, the lower end being bent forward at right angles, $10^4$, under the locking dog 11, fulcrumed at the same point, shown weighted at $11^2$.

12, Fig. 1, is the rear end of the cash receptacle, over which the locking dog hooks when drawer is closed. Behind the drawer and pushing against it when locked is spring 13. When the keys are operated and locking bar, N, is forced backward, it comes in contact with lever 10, and swings it on its fulcrum, the lower end raising the weighted locking dog, above the top of the drawer allowing the spring to push it forward or open. When the drawer is closed, the locking dog engages with and holds it until next operation.

Pivoted on the right hand side of the frame, B, Fig. 1, is a bell, 6, with crank tripping arm, L, which is fulcrumed at, L³, connected to rod F⁴ and operated by it. When any pair of keys is depressed, the rod, F⁴, is moved rearward, swinging bell crank which carries on its upper end a beveled engaging nose, L⁴. Fulcrumed to the case, B, underneath the bell 6, is the hammer, 6², adjusted so as to sound the bell when the tripping nose 6⁴ trips the trigger end of the hammer.

I do not desire to limit myself in the use of my improvements to any particular style or type of registers, as they are applicable to a great many such types of registers, nor do I desire to limit myself to the especial form and arrangements of the parts which are illustrated.

Having fully described my invention, what I claim is—

1. In a registering and indicating machine, the combination of a series of keys, arranged in pairs together with controlling mechanism, whereby both keys of the pair must be operated simultaneously, substantially as and for the purpose described.

2. In an indicating machine, the combination with a series of keys, arranged in pairs, of a series of tablet rods and tablets, and a supporting wing, together with connecting mechanism, whereby one key of the pair raises tablet rod, and tablet and the other key operates wing for the passage support and release of tablet rods and tablets substantially as described.

3. In an indicating machine the combination of a series of keys arranged in pairs, the keys of each pair being of unequal lengths and the rear end of the shorter bent at an angle with the longer key, substantially as and for the purpose described.

4. In an indicating machine the combination of a series of keys arranged in pairs, the keys of each pair being of unequal lengths, and the rear end of the shorter key being bent at an angle to the longer key, and controlling mechanism whereby both keys of the pair must be operated simultaneously, substantially as and for the purpose described.

5. In a registering and indicating machine the combination of a series of keys arranged in pairs, one of the pair having at its end a perforation or slot, and the end of the other entering into the slot, substantially as and for the purpose described.

6. In a registering and indicating machine, the combination of two series of keys, so arranged that one series raises tablet rod and tablet, and the other series manipulating supporting and releasing mechanism by operating a movable frame; said frame operating mechanism for locking the unoperated keys of the other series until operated keys have been moved to their farthest limit, substantially as described.

7. In a registering and indicating machine, the combination of a series of indicating tablets, operated by a series of keys, of a series of rods, each provided with a detent or shoulder, and carrying one of the aforesaid tablets, and a supporting wing operated by a series of keys together with controlling mechanism, whereby the key operating tablet rod and tablet and the key for operating wing must be operated simultaneously, and whereby upon operating the keys, the wing is so moved as to permit the passage of the rod and whereby upon the release of the keys, the wing engages with and holds up the tablet rod and tablet, substantially as and for the purpose described.

8. The combination of a key operating an indicating tablet, of a rod provided with a detent or shoulder and carrying a tablet, and a supporting wing operated by a key, together with controlling mechanism whereby the key operating tablet rod and tablet and the key for operating wing must be operated simultaneously substantially as and for the purpose described.

9. The combination of a series of keys operating a series of indicating tablets, of a series of rods each provided with a detent or shoulder and carrying one of the aforesaid tablets and a supporting wing operated by a key, together with controlling mechanism whereby the key operating tablet rod and tablet and key for operating wing must be operated simultaneously, substantially as and for the purpose described.

10. The combination of a series of keys arranged in pairs one key of each pair operating one of a series of indicating tablets, of a series of rods each provided with a detent or shoulder and carrying one of the aforesaid tablets, and the other key of the pair operating a supporting wing, together with controlling mechanism, whereby the key operating tablet rod and tablet and the key for operating wing must be operated simultaneously and whereby upon operating the keys, the wing is so moved as to permit the passage of the rod, and whereby upon the release of the keys the wing engages with and holds up the tablet rod and tablet, substantially as and for the purpose described.

11. The combination of a series of keys arranged in pairs, together with controlling mechanism whereby both keys of any pair must be operated simultaneously, of a series of tablet rods and tablets, a cross bar carrying a tripping dog, a retaining dog, a sliding frame and means for moving it forward when released from retaining dog on partial operation of keys, and on complete operation of keys the frame is returned to its normal position and a supporting wing operated thereby for retaining and releasing tablet rods and tablets substantially as and for the purpose described.

12. The combination of a series of tablet rods and tablets, operated by a series of keys, of a movable frame operated by an independent series of keys together with controlling mechanism whereby the two keys must be operated simultaneously and a supporting wing for supporting the raised tablets and tablet rods, also for releasing the tablet rods and tablets previously suspended, operated by said frame, substantially as and for the purpose described.

13. In a registering and indicating machine the combination of a series of keys arranged in pairs, one of each pair having at its end a perforation or slot, and the other extending into the slot, together with controlling mechanism, whereby both keys of each pair are made to move simultaneously, operating a series of indicating tablets, of a series of rods, each provided with a detent or shoulder and carrying one of the aforesaid tablets, of a supporting wing, and connecting mechanism, whereby upon operating the keys, the wing is so moved as to permit the passage of the rod, and whereby upon the release of the keys, the wing engages with and holds up the tablet rod and tablet substantially as and for the purpose described.

14. The combination of a series of keys arranged in pairs, one of the pairs having at its end a perforation or slot, and the end of the other extending into the slot, together with controlling mechanism whereby both keys of each pair are made to move simultaneously operating a series of indicating tablets of a series of rods each provided with a detent or shoulder and carrying one of the aforesaid tablets, of a supporting wing and connecting mechanism whereby upon operating the keys the wing is so moved as to permit the passage of the rod and whereby upon the release of the keys the wing engages with and holds up the tablet rod and tablet substantially as and for the purpose specified.

15. In a registering and indicating machine, the combination of a series of keys, operating a series of tablet rods and tablets, of a movable frame operated by an independent series of keys, together with controlling mechanism whereby one key of each series, must be operated simultaneously substantially as and for the purpose described.

16. The combination of a series of keys operating a tablet rod and tablet, and a movable frame operated by an independent series of keys, together with controlling mechanism whereby one key of each series must be operated simultaneously substantially as and for the purpose specified.

17. The combination of a series of keys arranged in pairs, together with controlling mechanism whereby both keys of the pair must be operated simultaneously, of a cross bar carrying a tripping dog, a retaining dog, a sliding frame and means for moving it forward when released from retaining dog on partial operation of keys, and on complete operation of keys the frame is returned to its normal position, substantially as and for the purpose described.

18. The combination of a series of keys arranged in pairs one of the pair having at its end a perforation or slot, and the end of the other entering into the slot together with controlling mechanism whereby both keys of the pair must be operated simultaneously, of a cross bar, carrying a tripping dog, a retaining dog, a sliding frame and means for moving it forward when released from retaining dog on partial operation of keys, and on complete operation of keys the frame is returned to its normal position substantially as and for the purpose specified.

19. The combination of a series of keys arranged in pairs together with controlling mechanism whereby both keys of any pair must be operated simultaneously, a sliding frame means for retaining it also for moving it forward and backward, carrying mechanism for locking the unoperated keys, when any pair of keys has been partially operated, and on complete operation of keys, the frame and lock are returned to their normal positions, substantially as and for the purpose described.

20. In a registering and indicating machine the combination with a series of keys of a sliding frame, means for retaining it, also for moving it forward and backward carrying mechanism for locking the unoperated keys and a retaining dog, whereby on the partial operation of the keys the retaining dog is tripped and frame and lock are moved so as to hold the unoperated keys in normal position, and whereby on complete operation of keys the frame and lock are returned to normal position substantially as and for the purpose specified and described.

21. The combination of a series of keys arranged in pairs together with controlling mechanism, whereby the two keys of each pair must be operated simultaneously, of a cross bar carrying a tripping dog, a retaining dog, a sliding frame, and means for moving it forward and backward when released from retaining dog on partial operation of keys, and on complete operation of keys the frame is returned to its normal position, and a key locking device operated by it, whereby on partial operation of keys, the unoperated keys are locked until the movement of operated keys is completed substantially as described.

22. The combination of a series of keys arranged in pairs, one of the pair having at its end a perforation or slot and the end of the other entering into the slot, with controlling mechanism whereby the two keys must be operated simultaneously, of a cross bar carrying a tripping dog, a retaining dog a movable frame and means for moving it forward and backward, when released from retaining dog on partial operation of keys, and on complete operation of keys the frame is returned to its normal position, and a key locking device operated by it, whereby on partial operation of keys the unoperated keys are locked until the operated keys perform their full stroke, substantially as and for the purpose described.

23. In a registering and indicating machine the combination of two keys, together with controlling mechanism, whereby the two keys must be operated simultaneously, one key operating a movable frame, said frame operating mechanism for locking the unoperated keys, until the operated keys have been moved to their farthest limit, substantially as and for the purpose described.

24. The combination of two series of keys together with controlling mechanism whereby one key of each series must be operated simultaneously, of a movable frame, means for retaining it also moving it forward and backward carrying mechanism for locking the unoperated keys, and a retaining dog whereby on the partial operation of the keys the retaining dog is tripped and frame and lock are moved so as to hold the unoperated keys in normal position and whereby on complete operation of keys frame operating lock is returned to its normal position substantially as and for the purpose described.

25. The combination of a series of keys arranged in pairs, of a contact plate with connecting mechanism, whereby each key of the pair must be moved simultaneously one clearing the way for the other, substantially as and for the purpose described.

26. The combination of two keys, each performing separate functions, of a contact plate with connecting mechanism, whereby each key must be operated simultaneously, one clearing the way for the other substantially as and for the purpose described.

27. The combination of two keys together with connecting mechanism whereby one key unlocks and regulates the movement of the other, substantially as and for the purpose specified and described.

28. In a registering and indicating machine, the combination of two keys, one key raising tablet rod and tablet the other operating retaining and releasing mechanism together with controlling mechanism whereby neither key can be operated without the assistance of the other, substantially as described.

29. The combination of a series of keys one key of the series operating tablet rod and tablet, another key operating a movable frame together with connecting mechanism for locking the unoperated keys, whereby all unoperated keys operating tablet rods and tablets are locked until the operated keys have been moved to their farthest limit substantially as and for the purpose described.

30. The combination of the operating key, W, cross bar, K, rod, $F^4$, and key arrester, N, together with operating key, E, cross bar, H, and follower, $H^4$, substantially as and for the purpose described.

31. The combination of the operating keys, W, cross bar K, tripping dog $K^8$, retaining dog P', hump $P^2$ sliding frame, X, and spring S, substantially as and for the purpose described.

32. The combination of the operating keys, W, cross bar, K, tripping dog $K^8$ retaining dog P', hump $P^2$ sliding frame, X, spring S, and key locking device $X^2$ substantially as and for the purpose described.

33. The combination of the operating key, W, cross bar, K, tripping dog $K^8$, retaining dog P', hump $P^2$ sliding frame, X, spring, S, together with wing, I, tablet rod J shoulder $J^6$ and tablet M substantially as described.

34. The combination of the operating keys W, and, E, cross bar, K, tripping dog $K^8$, retaining dog, P', hump, $P^2$, sliding frame, X, spring, S, together with wing I tablet rod J shoulder $J^6$ pin, $J^4$, and tablet, M, substantially as and for the purpose described.

35. The combination of the operating key, E, cross bar, K, rod $F^4$, and key arrester, N, together with operating key W, cross bar H and follower $H^4$ substantially as described.

36. In a registering and indicating machine, the combination of two keys, one key raising tablet rod and tablet, the other operating tablet retaining and releasing mechanism, together with controlling mechanism whereby both keys unless depressed simultaneously can not be operated, substantially as described.

37. In a registering and indicating machine, the combination of two series of keys, one series shorter than the other, the shorter keys operating a movable frame, said frame operating mechanism for locking the longer series of unoperated keys, until operated keys have been moved to their farthest limit, substantially as described.

38. In a registering and indicating machine, the combination of two series of keys, one series longer than the other, and controlling mechanism, whereby one long and one short key must be operated simultaneously, the shorter series operating a movable frame, said frame operating mechanism for locking the longer series of unoperated keys, until operated keys have been moved to their farthest limit, substantially as described.

39. In a registering and indicating machine, the combination of two keys, one of which raises a tablet rod and tablet, the other connected to tablet supporting and releasing mechanism, the end of one key slotted and the end of the other entering into said slot, substantially as described.

40. In a registering and indicating machine, the combination of two series of keys, one series raising tablet rods and tablets, the other series operating supporting and releasing mechanism, together with governing mechanism, whereby one key of each series must be operated together, one series operating a movable frame, said frame operating mechanism for locking the unoperated keys of the other series, until operated keys have been moved to their farthest limit, substantially as described.

41. In a registering and indicating machine, the combination of two keys, one key raising tablet rod and tablet, the other key operating tablet retaining and releasing mechanism, each key operating controlling mechanism for governing the movement of the other substantially as described.

42. In a registering and indicating machine, the combination of two series of keys, one series with its back ends longer than the other, together with governing mechanism, whereby one key of each series must be moved simultaneously, the shorter series operating a movable frame, said frame operating mechanism for locking the unoperated keys of the longer series, when one of each series have been operated until the operated keys have been moved to their farthest limit, substantially as described.

43. In a registering and indicating machine, the combination of two series of keys, one series with their back ends longer than the other, the shorter series operating a movable frame, said frame operating mechanism for locking the unoperated keys of the longer series, when one of each series has been operated, until the operated keys have been moved to their farthest limit substantially as described.

44. The combination of a series of figured disks each provided with a stop or detent, mounted on a cylindrical shaft, for supporting them, said shaft being perforated, and containing pawls operated by an inner shaft, together with a key adapted to move one shaft in advance of the other, substantially as described.

45. The combination of a series of figured disks each provided with a detent or stop, mounted on a perforated cylindrical shaft, for supporting them, said cylindrical shaft containing a movable frame, said frame carrying detents and operated by an independent shaft for engaging with detents on figured disks, substantially as described.

46. The combination of a series of figured disks, each provided with a detent or stop, mounted on a perforated cylindrical shaft for supporting them, said cylindrical shaft containing movable pawls or detents, which may be moved into or removed from the path of detents on figured disks by an independent inner shaft, together with an engaging key, designed to engage with both the cylindrical shaft and inner shaft, whereby at a revolution of the key both shafts will have been turned, substantially as described.

47. The combination of a series of figured disks, each provided with a stop or detent, mounted on a perforated cylindrical shaft for supporting them, said cylindrical shaft containing movable pawls or detents, which may be moved into or removed from the path of detents on figured disks, by an independent inner shaft, together with an engaging key, designed to engage with both the cylindrical shaft and inner shaft, whereby at a revolution of the key, both shafts will have been turned, and detents will have been raised through cylindrical shaft, engaging with detents on counting wheels, the reverse movement removing said pawls from path of detents, on counting wheels, substantially as described.

48. The combination of a series of figured disks, each provided with a stop or detent, mounted on a cylindrical shaft for supporting them, said shaft being slotted or perforated and containing pawls or detents operated by an inner shaft, together with a key adapted to move one shaft in advance of another, until the other is caught and moved substantially as described.

49. The combination of a key together with a series of figured disks, each provided with a detent or stop mounted on a perforated cylindrical shaft for supporting them, said shaft containing movable pawls or detents operated by an inner shaft, the end of each shaft being so constructed as to permit of one being advanced by said key ahead of the other, substantially as described.

50. The combination of operating key, W, cross bar, K, rod, $F^4$, and key arrester, N, together with follower, $H^4$, adjusted to increase or diminish the movement of said arrester, and cross bar, H, connected to the follower together with operating key, E, substantially as and for the purpose described.

51. The combination of the operating key, W, cross bar, K, tripping dog, $K^8$, retaining dog P', hump, $P^2$, sliding frame, X, spring, S, key locking device, $X^2$, and operating key, E, substantially as and for the purpose described.

JOHN A. BARNES.

Witnesses:
LIZZIE COUGHLIN,
Mrs. J. A. BARNES.